United States Patent
Long et al.

(10) Patent No.: US 11,714,300 B2
(45) Date of Patent: Aug. 1, 2023

(54) THERMOCHROMIC INTELLIGENT WINDOW WITH ADJUSTABLE EMISSIVITY

(71) Applicant: China-Singapore International Joint Research Institute, Guangdong (CN)

(72) Inventors: Yi Long, Guangdong (CN); Shancheng Wang, Guangdong (CN); Yang Zhou, Guangdong (CN)

(73) Assignee: CHINA-SINGAPORE INTERNATIONAL JOINT RESEARCH INSTITUTE, Guangdong (CN)

( * ) Notice: Subject to any disclaimer, the term of this patent is extended or adjusted under 35 U.S.C. 154(b) by 0 days.

(21) Appl. No.: 17/340,124

(22) Filed: Jun. 7, 2021

(65) Prior Publication Data
US 2021/0382333 A1 Dec. 9, 2021

(30) Foreign Application Priority Data
Jun. 6, 2020 (CN) .......................... 202010508270.9

(51) Int. Cl.
*G02F 1/01* (2006.01)
*E06B 3/40* (2006.01)
*E06B 9/24* (2006.01)

(52) U.S. Cl.
CPC .............. *G02F 1/0147* (2013.01); *E06B 3/40* (2013.01); *E06B 9/24* (2013.01); *E06B 2003/406* (2013.01); *E06B 2009/2417* (2013.01)

(58) Field of Classification Search
CPC ..... E06B 2009/2464; E06B 2009/2405; E06B 7/28; E06B 5/16; E06B 3/30; E06B 2009/2417; E06B 2003/406; E06B 9/24; E06B 3/40; G02F 1/014
See application file for complete search history.

(56) References Cited

U.S. PATENT DOCUMENTS

| 2015/0205021 A1* | 7/2015 | Howell .................. G02B 5/208 359/359 |
| 2018/0237608 A1* | 8/2018 | Hess .......................... C08J 9/28 |
| 2019/0179176 A1* | 6/2019 | Hu ........................ G02F 1/0147 |

* cited by examiner

*Primary Examiner* — Mariam Qureshi
(74) *Attorney, Agent, or Firm* — Muncy, Geissler, Olds & Lowe, P.C.

(57) ABSTRACT

Disclosed is a thermochromic intelligent window with an adjustable emissivity. The thermochromic intelligent window includes a window frame. A glass assembly is assembled in the window frame and includes a glass substrate. One side of the glass substrate is deposited with a metal oxide coating for adjusting the glass substrate, the metal oxide coating has a low-emission function, and the metal oxide coating is a layer of transparent indium tin oxide film. A solar-adjusted high-emission portion is assembled on the other side of the glass substrate and includes a first polyethylene layer. A hydroxypropyl cellulose hydrogel layer is assembled on an upper portion of the first polyethylene layer. A second polyethylene layer is further assembled on the hydroxypropyl cellulose hydrogel layer. The hydroxypropyl cellulose hydrogel layer is wrapped between the first polyethylene layer and the second polyethylene layer.

13 Claims, 11 Drawing Sheets

THERMOCHROMIC INTELLIGENT WINDOW WITH ADJUSTABLE EMISSIVITY

CROSS-REFERENCE TO RELATED APPLICATION

This application claims the priority benefit of China application serial no. 202010508270.9, filed on Jun. 6, 2020. The entirety of the above-mentioned patent application is hereby incorporated by reference herein and made a part of this specification.

BACKGROUND

Technical Field

The present invention relates to the technical field of heat energy recycling, in particular to a thermochromic intelligent window with an adjustable emissivity.

Description of Related Art

The Paris Agreement has been signed in 2018, which puts emphasis on significance of setting a global warming limit value at 1.5° C. to reduce carbon dioxide emission and save the energy source and call on the global society to reduce carbon emission. As construction energy consumption occupies 40% of global energy consumption, and energy consumption on heating, ventilation and air conditioning application occupy half of the construction energy consumption, improvement of application energy efficiency of an air conditioner is turned into a critical task for sustainability of buildings.

Compared with other building components, windows are known as the least energy-saving part in a building. Window direct sunlight is a primary factor which causes rise of indoor temperature in summer and over 30% of energy loss in winter is caused by the window, too. Light with three wavelengths: visible light (360-780 nm), infrared light (780-2500 nm) and intermediate infrared light (8-13 μm) is quite important for energy conservation of the window. The visible light and the infrared light contribute to indoor heating and intermediate infrared light is related to heat radiation. Therefore, an ideal energy-saving intelligent window shall have a lower sunlight transmittance and a higher intermediate infrared emissivity in summer to prevent the window from being heated by sunlight and radiated quickly through heat radiation. In winter, the window must have higher transparency in wave bands of visible light and infrared light and has a lower intermediate infrared emissivity to promote heating of sunlight and prevent heat loss. A promising energy-saving intelligent window shall have a higher solar modulation capability $\Delta T_{sol}$ and a good infrared emissivity switching capacity simultaneously.

A developing energy-saving window is one of prevailing research directions at present because it can adjust transmittance of sunlight when receiving stimulation. According to different stimulations, the developing energy-saving window can be divided into several types such as thermochromic, electrochromic and photochromic windows. In different developing technologies, the thermochromic window is regarded as the most stable, economical and rationally stimulated window due to characteristics of passiveness and zero power input. Although the developing intelligent window shows the good solar modulation capacity $\Delta T_{sol}$, there is still a gap between the developing intelligent window and an ideal intelligent window as the developing intelligent window cannot change the intermediate infrared emissivity. On the other hand, passive daytime radiative cooling is a newly discovered technology which cools a room in an auxiliary manner by reflecting the sunlight and radiating heat in form of intermediate infrared light to a cold outer space. Different from conventional heating and ventilation technologies such as an air conditioner, the radiative cooling technology does not need to use an external power supply and a cooling liquid. A radiative cooling material is widely taken as a cooling source, a radiative cooling film, a structural material and an energy-saving coating due to its unique performance. However, properties of the radiative cooling material impose restrictions on application thereof as the intelligent window. First of all, most radiative cooling materials is low in transmittance and high transmittance is critical for application of the window. Second, the intermediate emissivity of overwhelming majority of radiative cooling materials cannot be changed and a radiative cooling effect increases the heating energy consumption in winter, which not only counteracts heating energy consumption saved in summer, but also leads to increase of annular energy consumption. Thus, the radiative cooling material is inadvisable in winter and is also limited in application in a seasonable changing dynamic environment.

SUMMARY

The objective of the present invention is to overcome defects in the prior art and provides a thermochromic intelligent window with an adjustable emissivity. The present invention can enable a dynamic adjustment of heat radiative and sunlight transmittance at different wave bands according to changes of seasons and climates, thereby achieving to reduce indoor temperature, save the energy consumption favorably, reduce the cooling load of a building in summer and reduce the heat loss of the building in winter favorably.

In order to achieve the purpose, the present invention provides a thermochromic intelligent window with an adjustable emissivity. The thermochromic intelligent window includes a window frame. A glass assembly is assembled in the window frame and includes a glass substrate. One side of the glass substrate is deposited with a metal oxide coating for adjusting the glass substrate, the metal oxide coating has a low-emission function in the intermediate infrared region, and the metal oxide coating is a layer of transparent indium tin oxide film. A solar-adjusted high-emission portion is assembled on the other side of the glass substrate and includes a first polyethylene layer. A hydroxypropyl cellulose hydrogel layer is assembled on an upper portion of the first polyethylene layer. A second polyethylene layer is further assembled on the hydroxypropyl cellulose hydrogel layer. The hydroxypropyl cellulose hydrogel layer is wrapped between the first polyethylene layer and the second polyethylene layer.

Preferably, a first rotating shaft is assembled on an upper portion of the window frame, a second rotating shaft is assembled on a lower portion of the window frame, and the window frame can rotate positively and negatively about the first rotating shaft and the second rotating shaft.

Preferably, the first polyethylene layer and the second polyethylene layer are very high in transparency and good in chemical stability in wave bands of visible light, near-infrared light and intermediate infrared light.

Preferably, the hydroxypropyl cellulose hydrogel layer has a good solar modulation capability. The hydroxypropyl cellulose hydrogel layer is high in transparency below the transformation temperature and becomes non-transparent and blocks sunlight once the temperature exceeds the deformation temperature.

Preferably, the hydroxypropyl cellulose hydrogel layer has a very high intermediate infrared emissivity.

Compared with the prior art, the present invention has the following beneficial effects:

The thermochromic intelligent window is provided with the window frame. A glass assembly is assembled in the window frame and includes a glass substrate. One side of the glass substrate is deposited with a metal oxide coating for adjusting the glass substrate, the metal oxide coating has a low-emission function in the intermediate infrared region, and the metal oxide coating is a layer of transparent indium tin oxide film. A solar-adjusted high-emission portion is assembled on the other side of the glass substrate and includes a first polyethylene layer. A hydroxypropyl cellulose hydrogel layer is assembled on an upper portion of the first polyethylene layer. A second polyethylene layer is further assembled on the hydroxypropyl cellulose hydrogel layer. The hydroxypropyl cellulose hydrogel layer is wrapped between the first polyethylene layer and the second polyethylene layer. The metal oxide coating has a low-emission function in the intermediate infrared region and can eliminate the heat radiation. The first polyethylene layer and the second polyethylene layer can prevent the hydroxypropyl cellulose hydrogel layer from becoming dry. The hydroxypropyl cellulose hydrogel layer below its transformation temperature is very high in transparency and sunlight can penetrate the window smoothly. Once the temperature exceeds its transformation temperature, the hydroxypropyl cellulose hydrogel layer becomes non-transparent and blocks the sunlight. The hydroxypropyl cellulose hydrogel layer has a high-emission function and a very high intermediate infrared emissivity. By combining the two functional characteristics, the transmittance to sunlight can be adjusted automatically, and a good intermediate infrared emissivity switching capacity can be achieved. The window frame is designed to be reversible, so as to meet different requirements in summer and winter. In summer, the solar-adjusted high-emission portion faces outdoors and the metal oxide coating faces indoors, such that heat is released to the outer space in form of intermediate infrared light primarily. In the morning and evening, the window is kept transparent to meet a lighting requirement. The window becomes non-transparent at noon to block heating of the sunlight to the room. As radiative cooling and sunlight regulating effect are combined, the room is kept at a low temperature. In winter, as the metal oxide coating faces outdoors and the solar-adjusted high-emission portion faces indoors, indoor heat cannot be transferred outdoors by heat radiation, so that heat loss is prevented. Meanwhile, the bright transparent window further can enable the sunlight to heat the room, thereby reducing the heating energy consumption. The present invention can enable a dynamic adjustment of heat radiation and sunlight transmittance at different wave bands according to changes of seasons and climates, thereby achieving to reduce indoor temperature, save energy consumption, reduce the cooling load of a building in summer and reduce the heat loss of the building in winter.

BRIEF DESCRIPTION OF THE DRAWINGS

In order to describe the embodiments of the present invention or the technical scheme in the prior art more clearly, brief introduction on drawings needed to be used in the embodiment will be made below. It is obvious that the drawings described below are some embodiments of the present invention, and those skilled in the technical field further can obtain other drawings according to the drawings without creative efforts.

DESCRIPTION OF THE EMBODIMENTS

Clear and intact description will be made on technical scheme in the mode of execution of the present invention below in combination with drawings in the mode of execution of the present invention. It is obvious that the described mode of execution is merely one mode of execution of the present invention and is not all the modes of execution. On a basis of the modes of execution in the present invention, all other modes of execution obtained by those skilled in the technical field without creative efforts fall into the scope of protection of the present invention.

Figure 1:
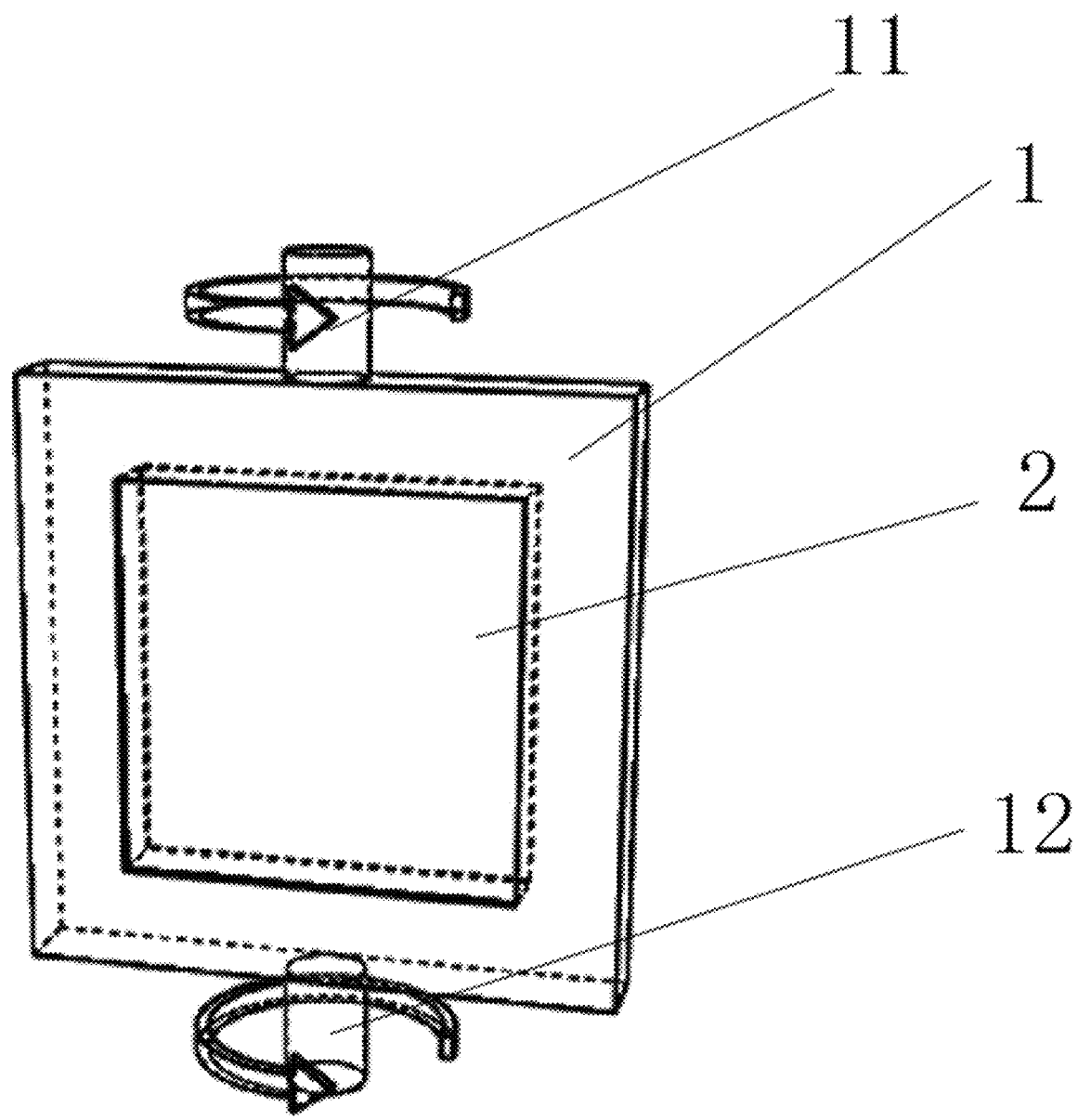
FIG. 1 is an integral structural schematic diagram of the thermochromic intelligent window with the adjustable emissivity provided by the present invention.
Figure 2:
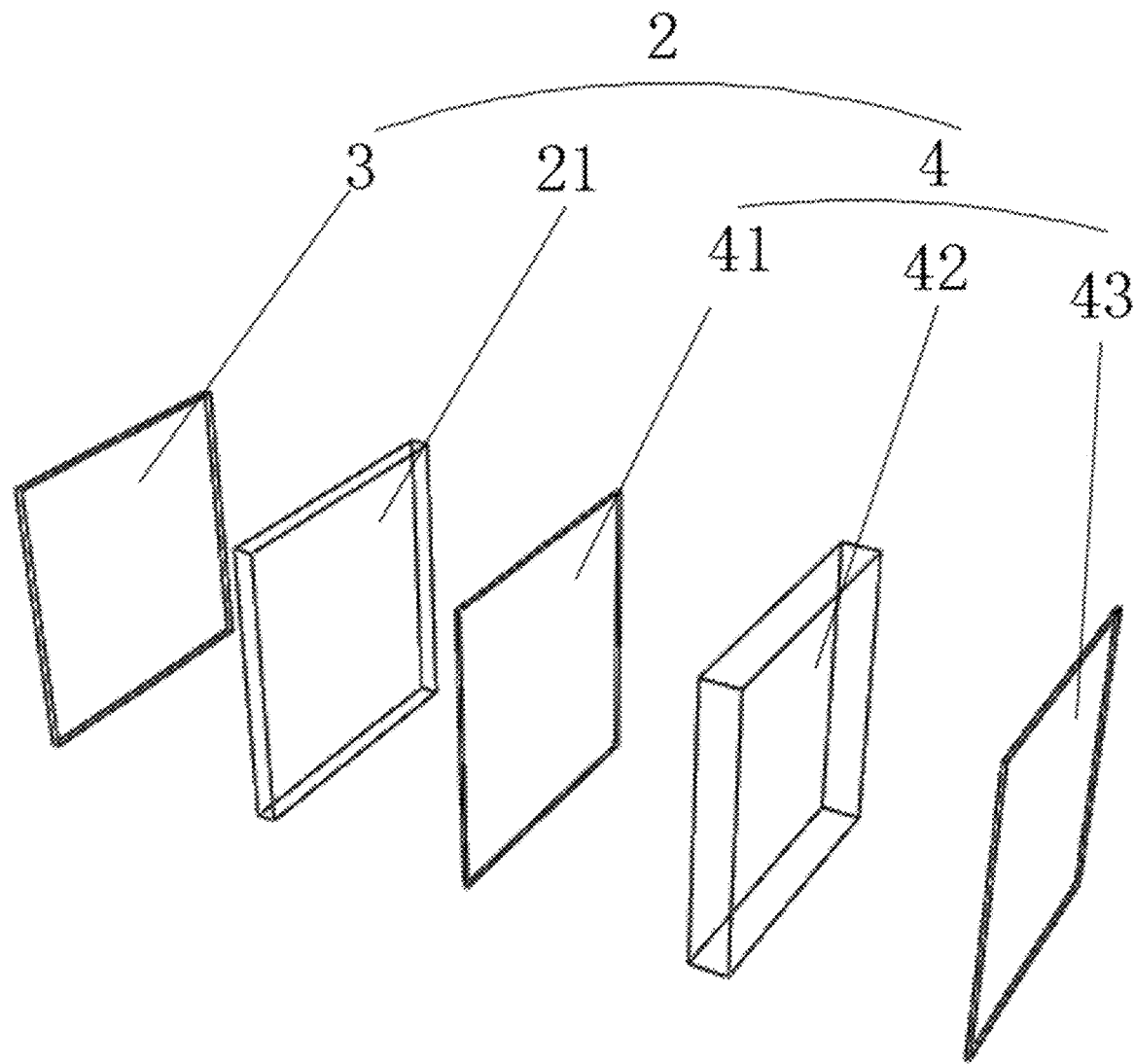
FIG. 2 is an exploded structural schematic diagram of the glass assembly of the thermochromic intelligent window with the adjustable emissivity provided by the present invention.
Figure 3:
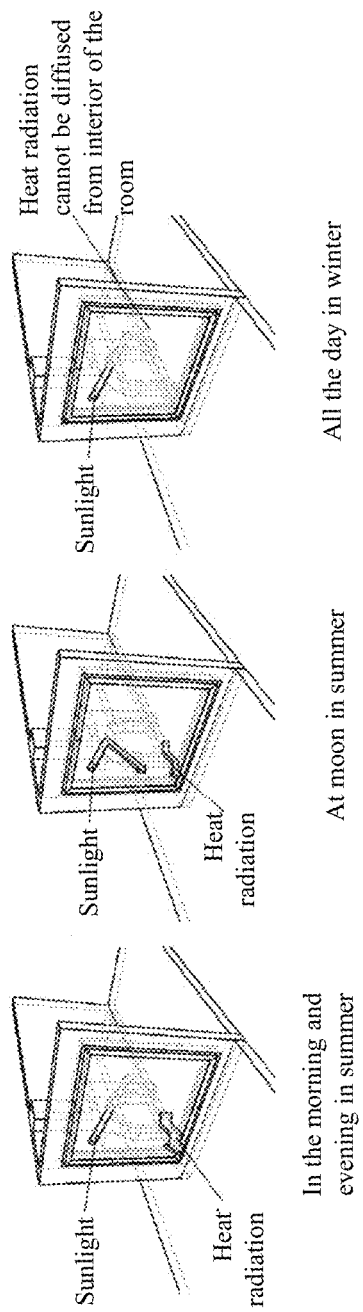
FIG. 3 is a working principle schematic diagram of the thermochromic intelligent window with the adjustable emissivity provided by the present invention in summer and winter.

Referring to FIG. 1 to FIG. 3, the present invention provides a thermochromic intelligent window with an adjustable emissivity. The thermochromic intelligent window includes a window frame 1. A glass assembly 2 is assembled in the window frame 1 and includes a glass substrate 21. One side of the glass substrate 21 is deposited with a metal oxide coating 3 for adjusting the glass substrate 21, the metal oxide coating 3 has a low-emission function in the intermediate infrared region, and the metal oxide coating 3 is a layer of transparent indium tin oxide film. A solar-adjusted high-emission portion 4 is assembled on the other side of the glass substrate 21 and includes a first polyethylene layer 41. A hydroxypropyl cellulose hydrogel layer 42 is assembled on an upper portion of the first polyethylene layer 41. A second polyethylene layer 43 is further assembled on the hydroxypropyl cellulose hydrogel layer 42. The hydroxypropyl cellulose hydrogel layer 42 is wrapped between the first polyethylene layer 41 and the second polyethylene layer 43.

The glass substrate 21 as an important component of the glass assembly 2 serves as a mechanical supporting layer of the thermochromic intelligent window. The metal oxide coating 3 has a low-emission function in the intermediate infrared region, and can eliminate the heat radiation. The hydroxypropyl cellulose hydrogel layer 42 is wrapped between the first polyethylene layer 41 and the second polyethylene layer 43. The first polyethylene layer 41 and the second polyethylene layer 43 are very high in transparency and good in chemical stability in wave bands of visible light, near-infrared light and intermediate infrared light. Therefore, the first polyethylene layer 41 and the second polyethylene layer 43 are used to prevent the hydroxypropyl cellulose hydrogel layer 42 from becoming dry. The hydroxypropyl cellulose hydrogel layer 42 which is rich in water, is a core component of the solar-adjusted high-emission portion 4, and has good solar modulation capability. The hydroxypropyl cellulose hydrogel layer 42 below its transformation temperature is very high in transparency and sunlight can penetrate the window smoothly. Once the temperature exceeds its transformation temperature, the hydroxypropyl cellulose hydrogel layer 42 becomes non-transparent and blocks the sunlight. As water is very high in intermediate infrared emissivity, the hydroxypropyl cellulose hydrogel layer 42 also has a high-emission function and a very high intermediate infrared emissivity. By combining the two functional characteristics, the transmittance to sunlight can be adjusted automatically, and a good intermediate infrared emissivity switching capacity can be achieved.

Referring to FIG. 1, a first rotating shaft 11 is assembled on an upper portion of the window frame 1, a second rotating shaft 12 is assembled on a lower portion of the window frame 1, and the window frame 1 can rotate positively and negatively about the first rotating shaft 11 and the second rotating shaft 12.

Referring to FIG. 1 and FIG. 3, the window frame 1 of the present invention is designed to be reversible to meet different requirements in summer and winter. In summer, the solar-adjusted high-emission portion 4 faces outdoors and the metal oxide coating 3 faces indoors, such that heat is released to the outer space in form of intermediate infrared light primarily. In the morning and evening, the window is kept transparent to meet a lighting requirement. The window becomes non-transparent at noon to block heating of the sunlight to the room. As radiative cooling and sunlight regulating effect are combined, the room is kept at a low temperature. In winter, as the metal oxide coating 3 faces outdoors and the solar-adjusted high-emission portion 4 faces indoors, indoor heat cannot be transferred outdoors by heat radiation, so that heat loss is prevented. Meanwhile, the bright transparent window further can enable the sunlight to heat the room, thereby reducing the heating energy consumption.

The transmittance $T_{lum}$ of the thermochromic intelligent window is 71.2% and the dimming ability $\Delta T_{sol}$ is 62.6%. Two sides of the thermochromic intelligent window are different obviously in intermediate infrared emissivity: the emissivity on the side of the solar-adjusted high-emission portion 4 is 0.95 and the emissivity on the side of the metal oxide coating 3 is 0.4.

In indoor and outdoor experiments, the thermochromic intelligent window shows excellent energy-saving performance. In indoor and outdoor experiments in summer, compared with the common glass, the thermochromic intelligent window achieves an air temperature drop of about 30° C. and is expected to a feasible path to achieve annual building energy conservation as a result of its performance.

Figure 4:
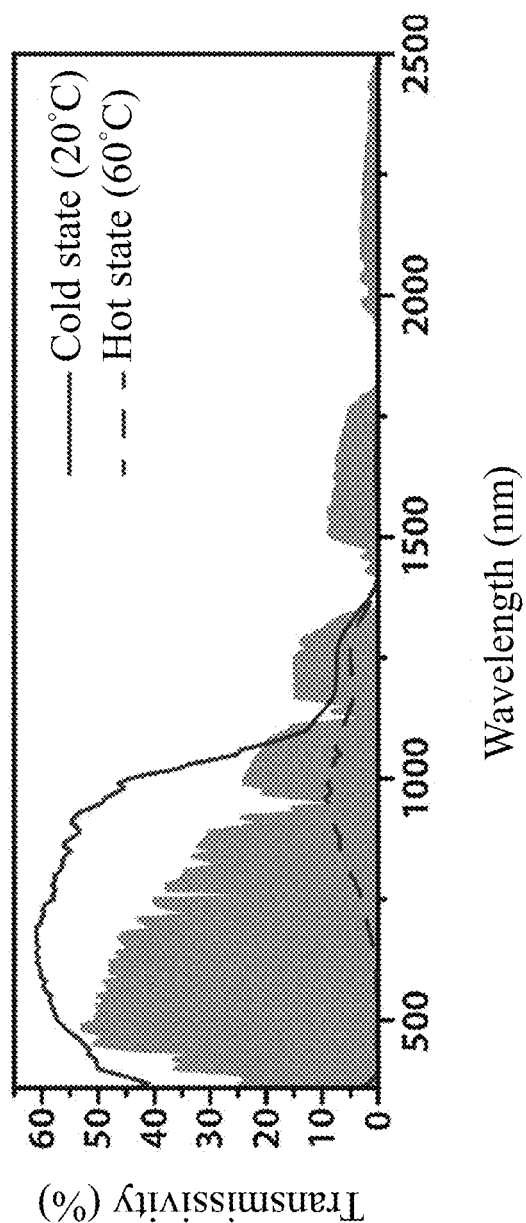
FIG. 4 is an ultraviolet light, visible light and near-infrared spectrum schematic diagram of the thermochromic intelligent window with the adjustable emissivity provided by the present invention at 20° C. and 60° C.

FIG. 4 shows ultraviolet light, visible light and near-infrared spectra of the thermochromic intelligent window at 20° C. and 60° C. respectively. At the low temperature (20° C.), the transmittance of the thermochromic intelligent window reaches up to 71.2%. As a result of an infrared blocking characteristic of the metal oxide coating 3, infrared spectra with wavelengths being 1400 nm or more are shielded fully. In addition, the thermochromic intelligent window has the good transmittance adjusting ability $T_{lum}$: 62.6% and the sunlight adjusting ability $\Delta T_{sol}$: 40.0%.

Figure 5:
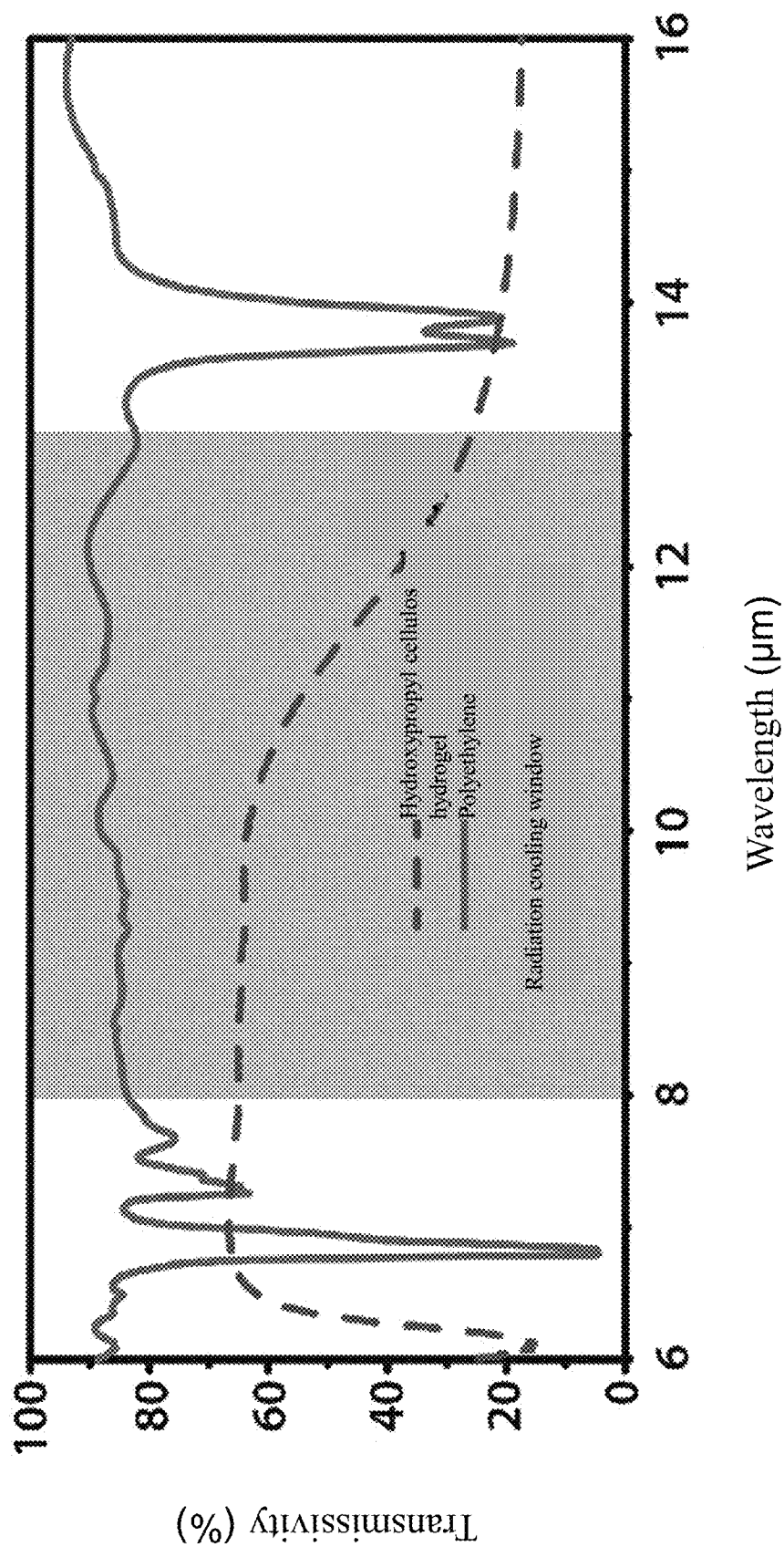
FIG. 5 is a transmitted spectrum schematic diagram of polyethylene and hydroxypropyl cellulose hydrogel within a range of 6-16 μm.

FIG. 5 shows the transmitted spectra of polyethylene and hydroxypropyl cellulose hydrogel within a range of 6-16 μm. It can be observed that in the radiative cooling window (8-13 μm), polyethylene shows high transmittance that reaches up to 80% and the hydroxypropyl cellulose hydrogel shows transmittance of about 50%. Polyethylene is very high in infrared transparency, such that heat in the hydroxypropyl cellulose hydrogel can be released to a space effectively.

Figure 6:
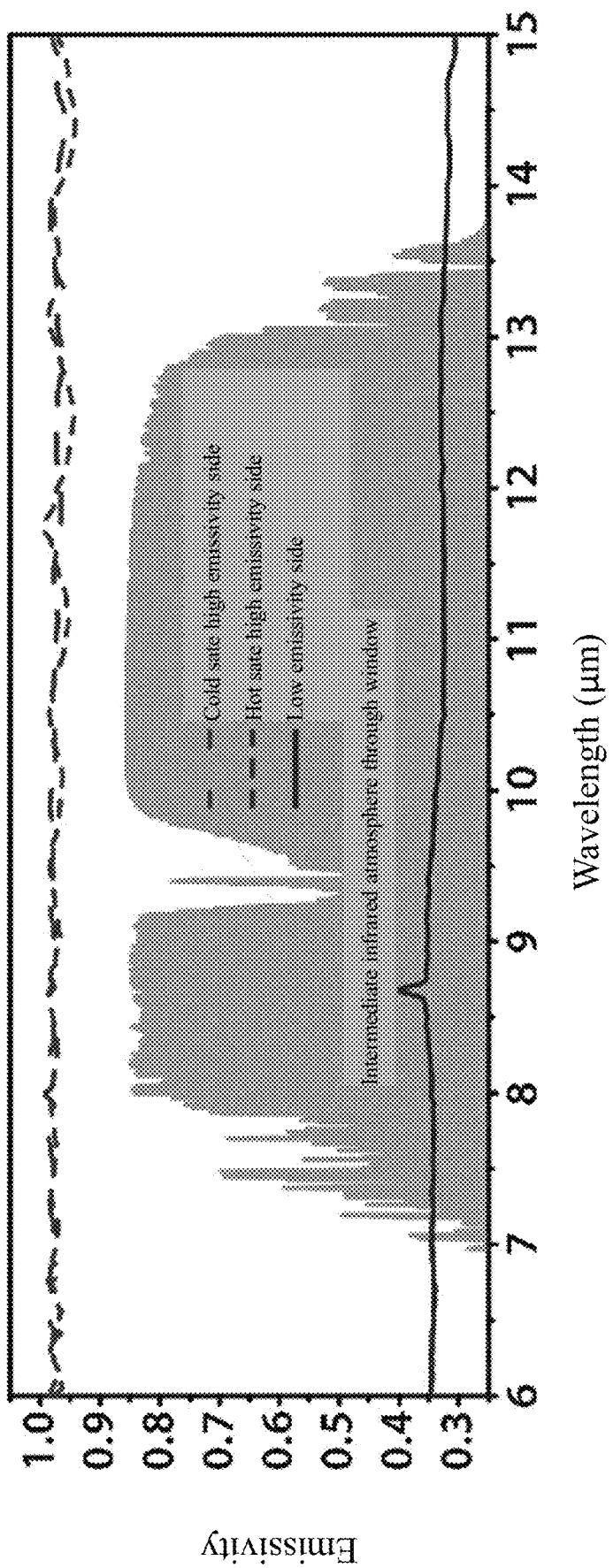
FIG. 6 is an emissivity spectrum schematic diagram of a high emissivity side and a low emissivity side of the thermochromic intelligent window with the adjustable emissivity provided by the present invention in different states.

FIG. 6 shows emissivity spectra of the high emissivity side and the low emissivity side in different states. In the cold state and the hot state, the high emissivity side has the high emissivity that reaches up to 0.95 and the emissivity of the low emissivity side is 0.35 which is obviously lower than that of common glass (0.88). Thus, it can be concluded that the window has an ability of controlling intermediate infrared radiation directionally.

Figure 7:
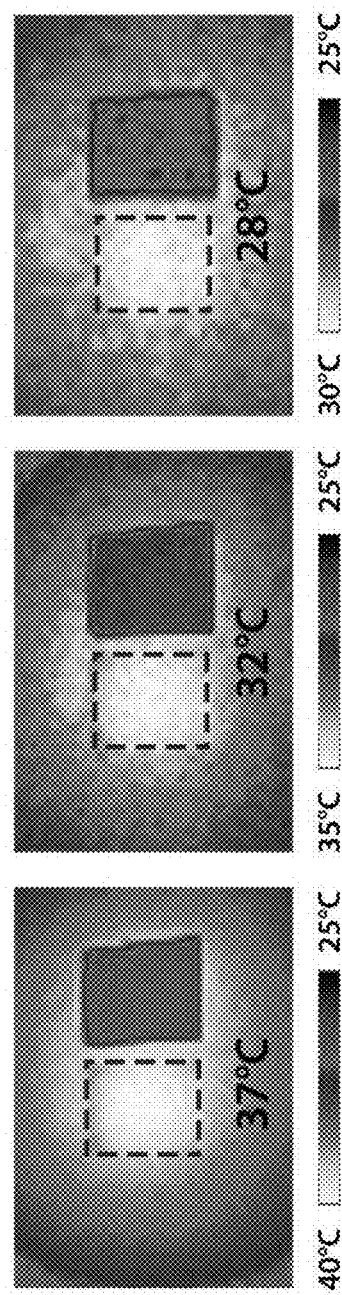
FIG. 7 is an infrared image schematic diagram of the low emissivity side and the high emissivity side of the thermochromic intelligent window with the adjustable emissivity provided by the present invention at different temperatures.

FIG. 7 shows infrared images of the low emissivity side and the high emissivity side at different temperatures. A result shows that the temperature of the high emissivity side is higher than a background temperature and the temperature of the low emissivity side is lower than the background temperature. The temperature difference is a result of difference of the intermediate infrared emissivities of the two sides of the window. As the intermediate infrared emissivity 0.95 of the high emissivity side is higher than the intermediate infrared emissivity 0.88 in a background, an infrared radiation intensity of the high emissivity side is higher than that in the background, so that the high emissivity side appears to be hotter than the background. On the other hand, as the intermediate infrared emissivity 0.35 of the low emissivity side is lower than the intermediate infrared emissivity 0.88 in the background, the low emissivity side emits less infrared radiation, and appears to be colder than the background.

Figure 8:
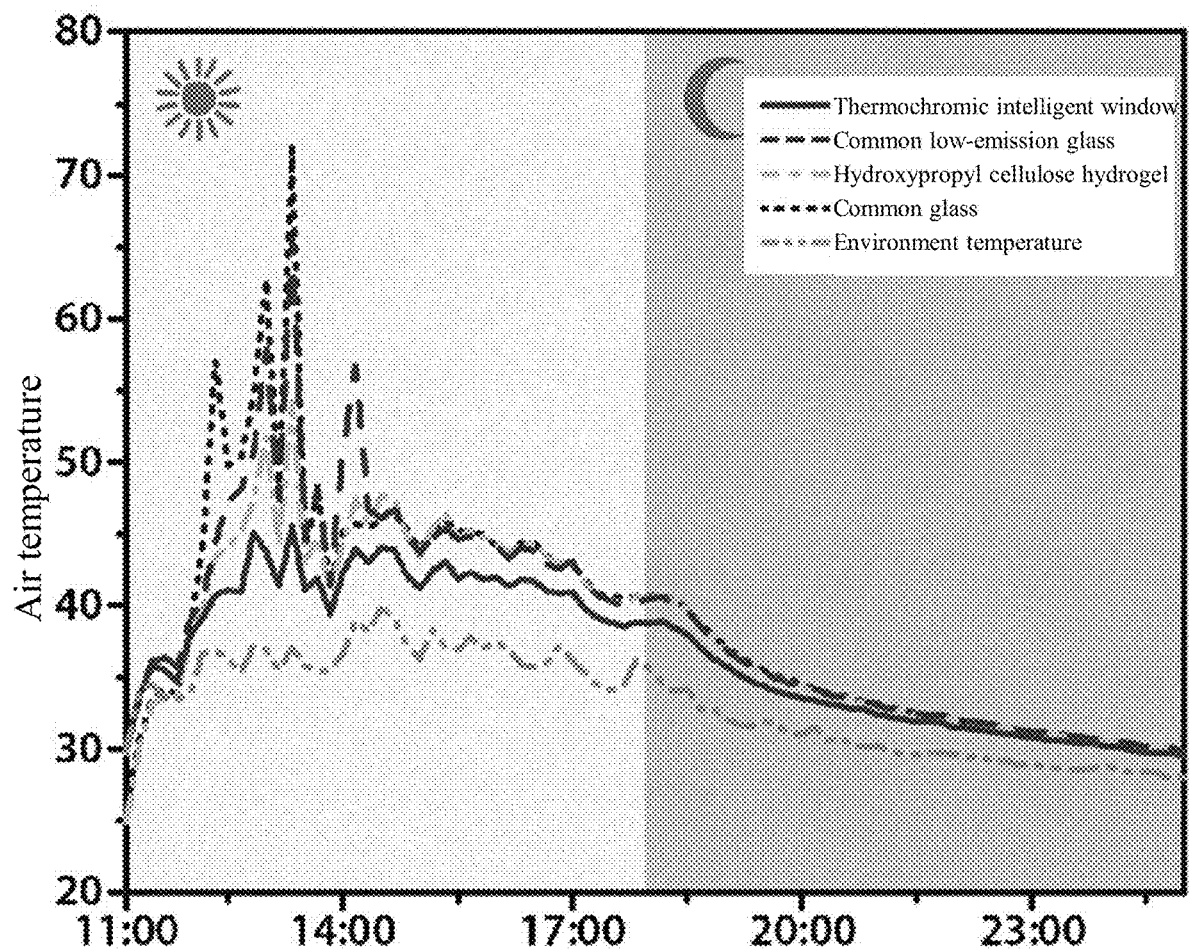
FIG. 8 is an air temperature curve of the thermochromic intelligent window, common low-emission glass, the hydroxypropyl cellulose hydrogel, common glass and an environmental temperature in an outdoor energy-saving effect experiment in summer in Singapore.
Figure 9:
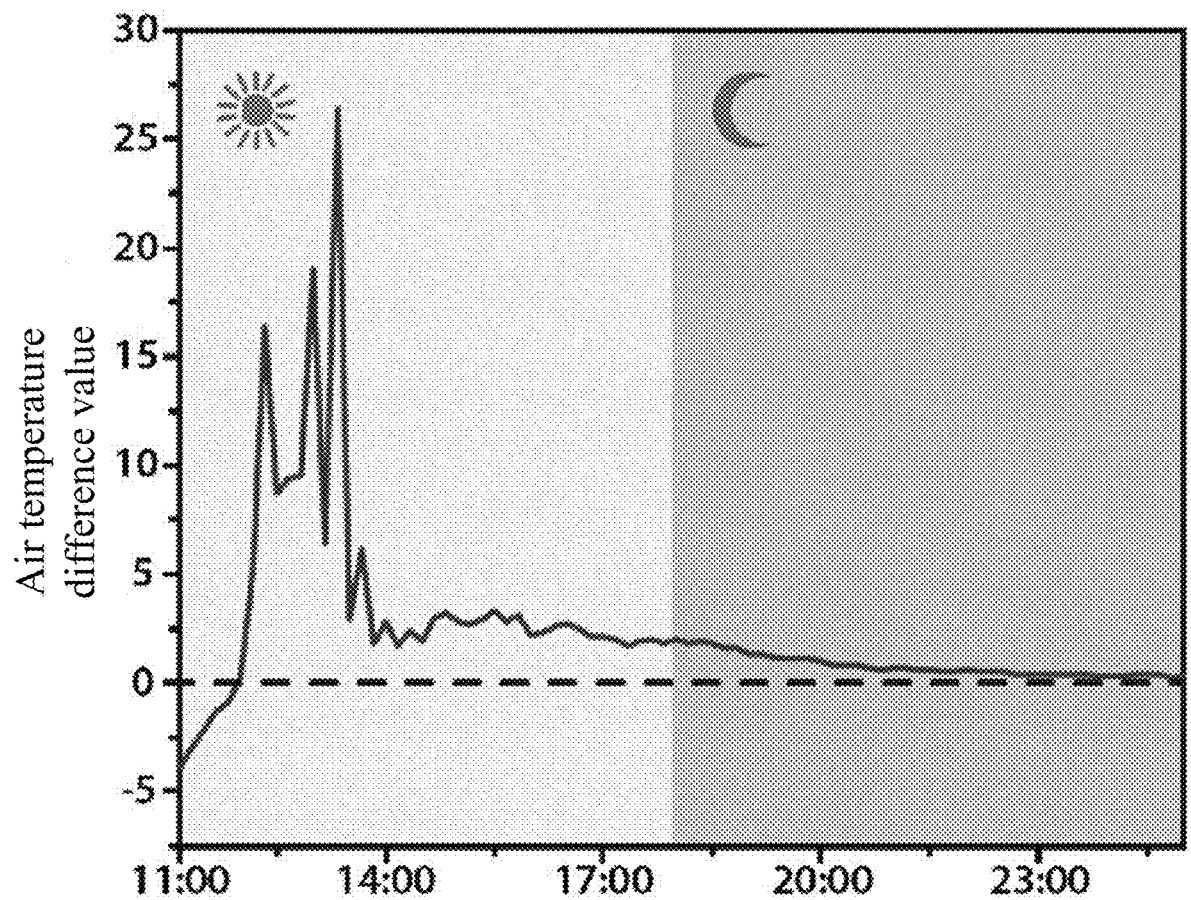
FIG. 9 is a temperature difference curve of the thermochromic intelligent window and the common glass in the outdoor energy-saving effect experiment in summer in Singapore.

FIG. 8 and FIG. 9 show temperature readings and temperature differences of the thermochromic intelligent window, common low-emission glass, the hydroxypropyl cellulose hydrogel and common glass in the outdoor energy-saving effect experiment in summer in Singapore. The thermochromic intelligent window has the obvious energy-saving performance and the room with the thermochromic intelligent window is lowest in indoor temperature at daytime among four rooms. It is worth mentioning that the temperature difference between the room with the thermochromic intelligent window and the room with the common glass window is 27.5° C. from twelve o'clock at noon to three o'clock in the afternoon. Meanwhile, the temperature of the room with the thermochromic intelligent window is also 9° C. lower than that of the conventional hydroxypropyl cellulose hydrogel room and 20° C. lower than that of the room with the common low-emission glass, showing that the thermochromic intelligent window has the very high solar modulation capability and the good intermediate infrared emissivity switching ability, and has very good energy-saving performance.

Figure 10:
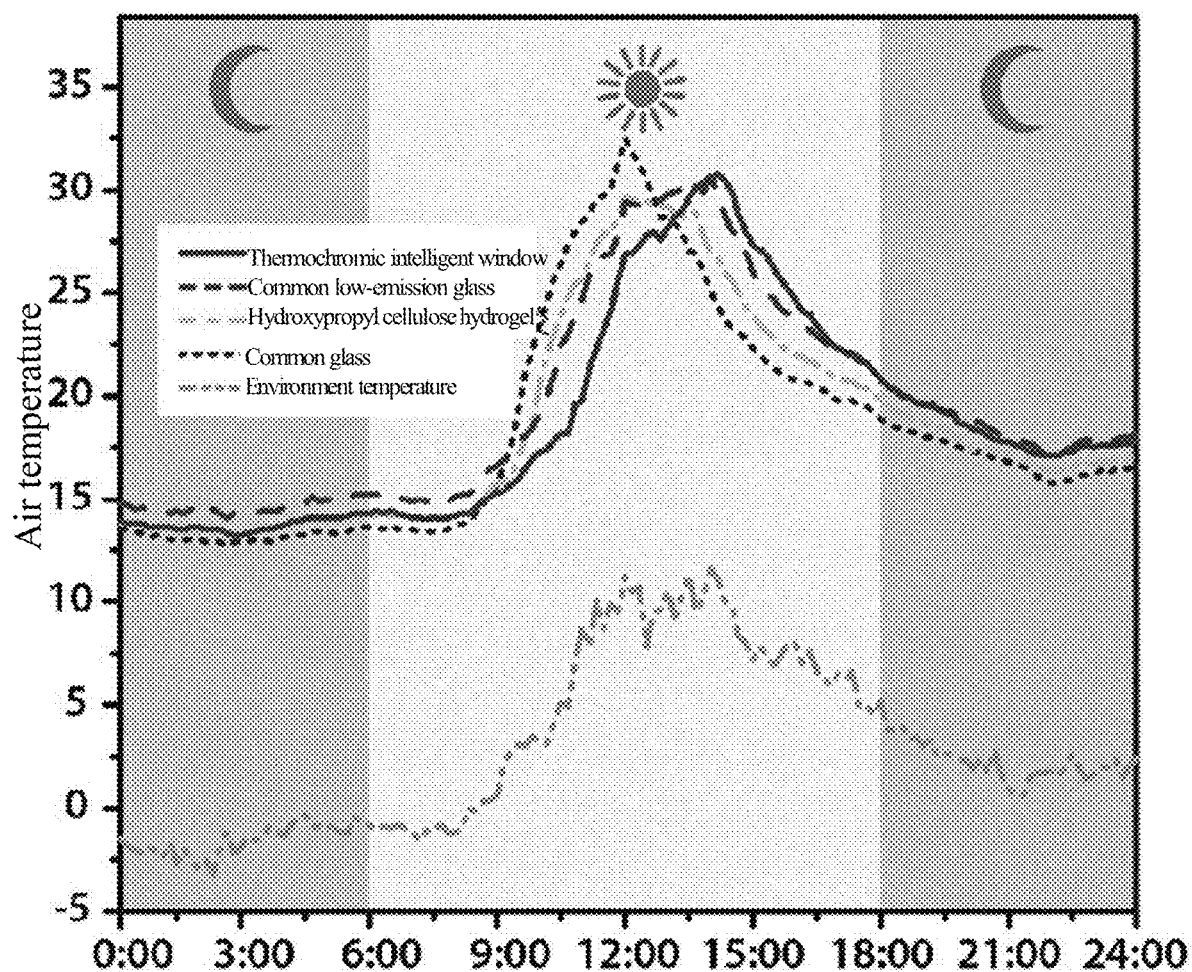
FIG. 10 is an air temperature curve of the thermochromic intelligent window, common low-emission glass, the hydroxypropyl cellulose hydrogel, common glass and an environmental temperature in an outdoor energy-saving effect experiment in winter in Jinan.
Figure 11:
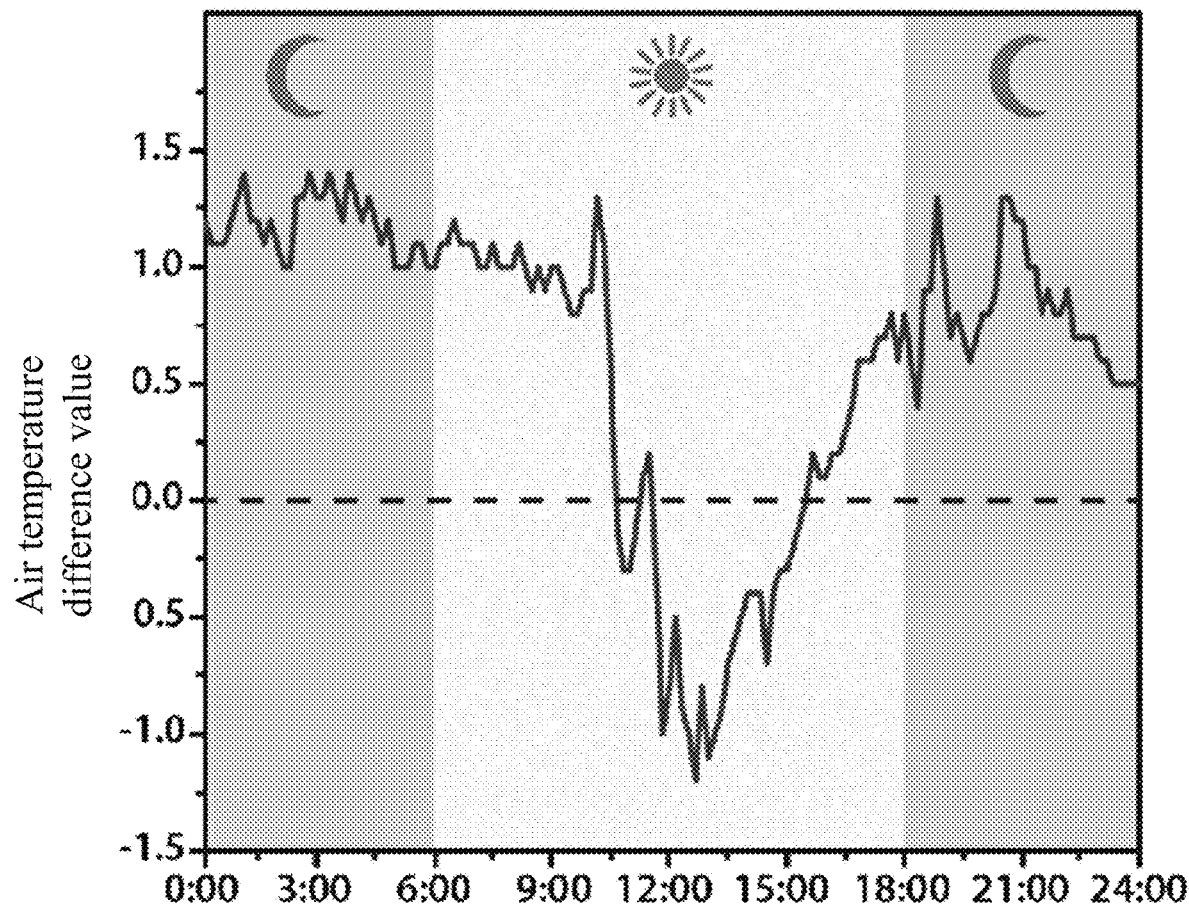
FIG. 11 is a temperature difference curve of the thermochromic intelligent window and the common glass in the outdoor energy-saving effect experiment in winter in Jinan.

FIG. 10 and FIG. 11 show temperature readings and temperature differences of the thermochromic intelligent window, common low-emission glass, the hydroxypropyl cellulose hydrogel, and common glass in the outdoor energy-saving effect experiment in winter in Jinan. At night in winter, the temperature difference between the indoor temperatures of the room with the common low-emission glass is 15° C. all the day, ranking the first; the temperature difference between the indoor temperatures of the room with the thermochromic intelligent window is 13.5° C. all the day, ranking the second; and the temperature difference between the indoor temperatures of the room with the common glass window is 12.5° C. all the day, ranking the third. The experiment or observation result verifies that the thermochromic intelligent window is better in energy-saving performance than the common glass window all the day in winter, thereby further verifying the energy-saving performance of the thermochromic intelligent window.

A portion between the first polyethylene layer 41 and the second polyethylene layer 43 is filled with the hydroxypropyl cellulose hydrogel layer 42 and the glass substrate 21 is deposited with the metal oxide coating 3 with the low-emission function, such that the thermochromic intelligent window with the adjustable emissivity is manufactured. The thermochromic intelligent window has the satisfactory performance in adjusting the solar transmittance and switching the intermediate infrared emissivity. The thermochromic intelligent window shows the high transmittance $T_{lum}$ of 71% at room temperature and has the good light emitting adjusting ability of 62% when being heated. In addition, the hydroxypropyl cellulose hydrogel layer 42 shows a very high intermediate infrared emissivity 0.95. Compared with the common glass, the thermochromic intelligent window reduces the temperature by about 30° C. in daytime in summer as a result of good sunlight transmittance adjusting ability and the unique intermediate infrared emissivity switching characteristic. At the same time, the thermochromic intelligent window also shows the satisfactory energy-saving ability in winter. In conclusion, the thermochromic intelligent window plays an important role in improving building sustainability by combining advantages of the metal oxide coating 3 with low intermediate infrared emissivity and the thermochromic hydroxypropyl cellulose hydrogel layer 42 with high intermediate infrared emissivity.

In conclusion, the present invention has the beneficial effects that:

The metal oxide coating 3 has a low-emission function in the intermediate infrared region and can eliminate the heat radiation. The first polyethylene layer 41 and the second polyethylene layer 42 can prevent the hydroxypropyl cellulose hydrogel layer 42 from becoming dry. The hydroxypropyl cellulose hydrogel layer 42 below its transformation temperature is very high in transparency and sunlight can penetrate the window smoothly. Once the temperature exceeds its transformation temperature, the hydroxypropyl cellulose hydrogel layer 42 becomes non-transparent and blocks the sunlight. The hydroxypropyl cellulose hydrogel layer 42 has a high-emission function and a very high intermediate infrared emissivity. By combining the two functional characteristics, the transmittance to sunlight can be adjusted automatically, and a good intermediate infrared emissivity switching capacity can be achieved. The window frame 1 of the present invention is designed to be reversible to meet different requirements in summer and winter. In summer, the solar-adjusted high-emission portion 4 faces outdoors and the metal oxide coating 3 faces indoors, such that heat is released to the outer space in form of intermediate infrared light primarily. In the morning and evening, the window is kept transparent to meet a lighting requirement. The window becomes non-transparent at noon to block heating of the sunlight to the room. As radiative cooling and sunlight regulating effect are combined, the room is kept at a low temperature. In winter, as the metal oxide coating 3 faces outdoors and the solar-adjusted high-emission portion 4 faces indoors, indoor heat cannot be transferred outdoors by heat radiation, so that heat loss is prevented. Meanwhile, the bright transparent window further can enable the sunlight to heat the room, thereby reducing the heating energy consumption. The present invention can enable a dynamic adjustment of heat radiation and sunlight transmittance at different wave bands according to changes of seasons and climates, thereby achieving to reduce indoor temperature, save energy consumption, reduce the cooling load of a building in summer and reduce the heat loss of the building in winter.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A thermochromic intelligent window with an adjustable emissivity, comprising:
    a glass substrate;
    a low emissivity layer deposited on one side of the glass substrate, wherein an emissivity of the low emissivity layer within a wavelength coverage of 8-13 μm is not greater than 0.4;
    a high emissivity layer deposited on an other side of the glass substrate opposite to the one side of the glass substrate, wherein an emissivity of the high emissivity layer within a wavelength coverage of 8-13 μm is not less than 0.88,
    wherein the low emissivity layer faces outdoor in winter,
    wherein the high emissivity layer comprises a first polyethylene layer and a second polyethylene layer, a hydroxypropyl cellulose hydrogel layer is wrapped between the first polyethylene layer and the second polyethylene layer, and the high emissivity layer faces outdoor in summer, and
    wherein the high emissivity layer has a sunlight regulating function, has a high sunlight transmittance when a temperature falls below a transformation temperature of the high emissivity layer and has a low sunlight transmittance when a temperature rises above the transformation temperature of the high emissivity layer.

2. The window according to claim 1, wherein the emissivity of the high emissivity layer within a wavelength coverage of 8-13 μm is not less than 0.95.

3. The window according to claim 1, wherein the low emissivity layer is transparent indium tin oxide.

4. The window according to claim 3, wherein the low emissivity layer shields infrared light with a wavelength of 1400 nm or more.

5. The window according to claim 1, wherein the high emissivity layer comprises a hydroxypropyl cellulose hydrogel layer.

6. The window according to claim 1, wherein a transmittance of the first polyethylene layer and the second polyethylene layer within a wavelength coverage of 8-13 µm is not less than 80%.

7. A thermochromic intelligent window with an adjustable emissivity, comprising:
   at least one glass substrate;
   at least one low emissivity layer, an emissivity of the low emissivity layer within a wavelength coverage of 8-13 µm being not greater than 0.4 and the low emissivity layer being arranged on a side surface of the glass substrate;
   at least one high emissivity layer, an emissivity of the high emissivity layer within a wavelength coverage of 8-13 µm being not less than 0.88 and the high emissivity layer being arranged on an other side surface of the glass substrate opposite to the side surface of the glass substrate; and
   a window frame, the window frame being provided with at least one rotating shaft, allowing the high emissivity layer or the low emissivity layer to face outdoors via the rotating shaft,
   wherein the high emissivity layer comprises a first polyethylene layer and a second polyethylene layer, and a hydroxypropyl cellulose hydrogel layer is wrapped between the first polyethylene layer and the second polyethylene layer, and
   wherein the high emissivity layer has a sunlight regulating function, has a high sunlight transmittance when a temperature falls below a transformation temperature of the high emissivity layer and has a low sunlight transmittance when a temperature rises above the transformation temperature of the high emissivity layer.

8. The window according to claim 7, wherein the emissivity of the high emissivity layer within a wavelength coverage of 8-13 µm is not less than 0.95.

9. The window according to claim 7, wherein the low emissivity layer is transparent indium tin oxide.

10. The window according to claim 9, wherein the low emissivity layer shields infrared light with a wavelength of 1400 nm or more.

11. The window according to claim 7, wherein the high emissivity layer comprises a hydroxypropyl cellulose hydrogel layer.

12. The window according to claim 7, wherein a transmittance of the first polyethylene layer and the second polyethylene layer within a wavelength coverage of 8-13 µm is not less than 80%.

13. The window according to claim 7, wherein the high emissivity layer faces outdoors in summer and the low emissivity layer faces outdoors in winter.

* * * * *